US010302750B2

(12) United States Patent
Flynn et al.

(10) Patent No.: US 10,302,750 B2
(45) Date of Patent: May 28, 2019

(54) METHOD AND SYSTEM FOR ARBITRARY WAVEFORM GENERATION USING A TRI-STATE TRANSMIT PULSER

(71) Applicant: Verasonics, Inc., Kirkland, WA (US)

(72) Inventors: John A. Flynn, Seattle, WA (US); Peter J. Kaczkowski, Seattle, WA (US); Brian J. Pflugrath, Bellevue, WA (US); Lauren S. Pflugrath, Seattle, WA (US)

(73) Assignee: VERASONICS, INC., Redmond, WA (US)

( * ) Notice: Subject to any disclaimer, the term of this patent is extended or adjusted under 35 U.S.C. 154(b) by 178 days.

(21) Appl. No.: 14/905,434

(22) PCT Filed: Jul. 17, 2014

(86) PCT No.: PCT/US2014/047080
§ 371 (c)(1),
(2) Date: Jan. 15, 2016

(87) PCT Pub. No.: WO2015/009960
PCT Pub. Date: Jan. 22, 2015

(65) Prior Publication Data
US 2016/0161603 A1 Jun. 9, 2016

Related U.S. Application Data

(60) Provisional application No. 61/856,488, filed on Jul. 19, 2013.

(51) Int. Cl.
G01S 7/52 (2006.01)
B06B 1/02 (2006.01)
G01S 15/89 (2006.01)

(52) U.S. Cl.
CPC .......... *G01S 7/5202* (2013.01); *B06B 1/0215* (2013.01); *G01S 7/5205* (2013.01); *G01S 7/52052* (2013.01); *G01S 7/52077* (2013.01); *G01S 15/8981* (2013.01); *B06B 2201/76* (2013.01)

(58) Field of Classification Search
CPC .. G01S 7/5202; G01S 7/5205; G01S 7/52077; G01S 7/52052
See application file for complete search history.

(56) References Cited

U.S. PATENT DOCUMENTS

| 7,254,493 B1 * | 8/2007 | Pelletier | G01F 1/66 340/856.4 |
| 2004/0000841 A1 * | 1/2004 | Phelps | B06B 1/0622 310/314 |
| 2004/0254459 A1 | 12/2004 | Kristoffersen et al. | |
| 2006/0084859 A1 * | 4/2006 | Johnson | A61B 5/0507 600/407 |

(Continued)

FOREIGN PATENT DOCUMENTS

| EP | 0 233 676 A1 | 8/1987 |
| GB | 2 075 680 A | 11/1981 |
| JP | H08-140971 A | 6/1996 |

*Primary Examiner* — Hovhannes Baghdasaryan
(74) *Attorney, Agent, or Firm* — Seed IP Law Group LLP

(57) ABSTRACT

A method and system for generating arbitrary ultrasonic waveforms using a tri-state transmitter. Three variants of the device are described to provide functionality in three usage scenarios.

31 Claims, 11 Drawing Sheets

(56) References Cited

U.S. PATENT DOCUMENTS

2010/0298689 A1* 11/2010 Wang .................. A61B 5/0059
600/407
2011/0060225 A1* 3/2011 Cogan .................. B06B 1/0207
600/459

* cited by examiner

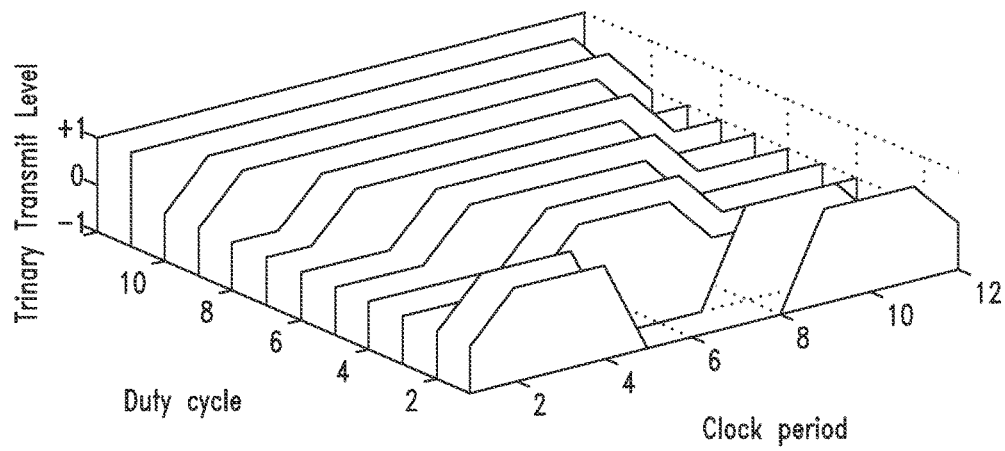
FIG. 5A  Example Symbol Set Definition
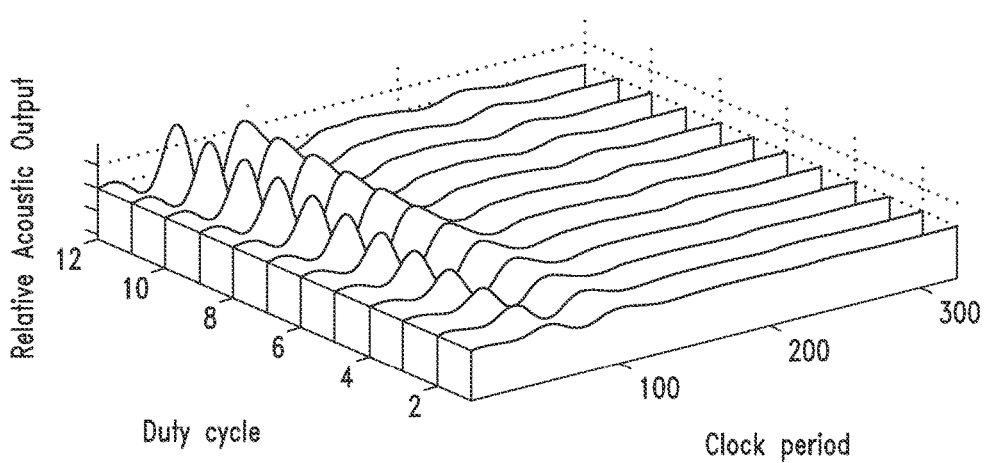
FIG. 5B  Resulting Acoustic Output For Symbols

METHOD AND SYSTEM FOR ARBITRARY WAVEFORM GENERATION USING A TRI-STATE TRANSMIT PULSER

BACKGROUND

Technical Field

The present disclosure pertains to methods for encoding arbitrary waveforms into a sequence suitable for control of a tri-state RF ultrasonic transmitter under various fidelity criteria, and to a related ultrasound system.

Description of the Related Art

Ultrasound Imaging has developed into an effective tool for diagnosing a wide variety of disease states and conditions. The market for ultrasound equipment has seen steady growth over the years, fueled by improvements in image quality and the capability to differentiate various types of tissue. Unfortunately, there are still many applications for ultrasound systems where the equipment costs are too high for significant adoption. Examples are application areas such as breast cancer detection, prostate imaging, musculoskeletal imaging, and interventional radiology. In these areas and others, the diagnostic efficacy of ultrasound imaging depends on excellent spatial and contrast resolution for differentiation and identification of various tissue types. These performance capabilities are found only on the more expensive ultrasound systems, which have more extensive processing capabilities.

Ultrasound imaging has always required extensive signal and image processing methods, especially for array systems employing as many as 128 or more transducer elements, each with unique signal processing requirements. The last decade has seen a transition to the improved accuracy and flexibility of digital signal processing in almost all systems except for those at the lowest tiers of the market. This transition has the potential for reducing system costs in the long term by utilizing highly integrated digital circuitry. Unfortunately, the low manufacturing volumes of ultrasound systems results in substantial overhead and fixed costs for these unique circuits, and thus the transition to digital signal processing has not significantly reduced system cost.

BRIEF SUMMARY

In accordance with one aspect of the present disclosure, a method is provided that includes executing an encoding process at a corresponding ultrasonic receiver apparatus that converts a user-specified waveform into a binary or trinary symbol sequence suitable for the transmitter to increase fidelity, providing to an ultrasonic transducer element or elements the binary or trinary sequence of symbolic values with a corresponding sequence of positive, negative, or quiescent voltage levels at a corresponding uniform sequence of ultrasonic clock intervals, and accepting the binary or trinary sequence of symbolic values at the ultrasonic transducer element or elements to cause the generation of an acoustic signal into a medium.

In accordance with another aspect of the present disclosure, a system is provided that includes at least one ultrasound probe configured to produce acoustic waveforms in an acoustic medium, the probes including ultrasonic transducer elements, a corresponding ultrasonic receiver apparatus configured to execute an encoding process configured to convert a user-specified waveform into a binary or trinary symbol sequence suitable to achieve increased fidelity, and a transmitter circuit configured to accept the binary or trinary sequence of symbolic values that are configured to energize the ultrasonic transducer element with a corresponding sequence of positive, negative, or quiescent voltage levels at a corresponding uniform sequence of ultrasonic clock intervals and to generate an acoustic signal or waveform into an acoustic medium, such as water or tissue.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIGS. 5A-5B illustrate an example set of symbols used for an experiment in a sequel in accordance with the method of the present disclosure;

DETAILED DESCRIPTION

Figure 1:
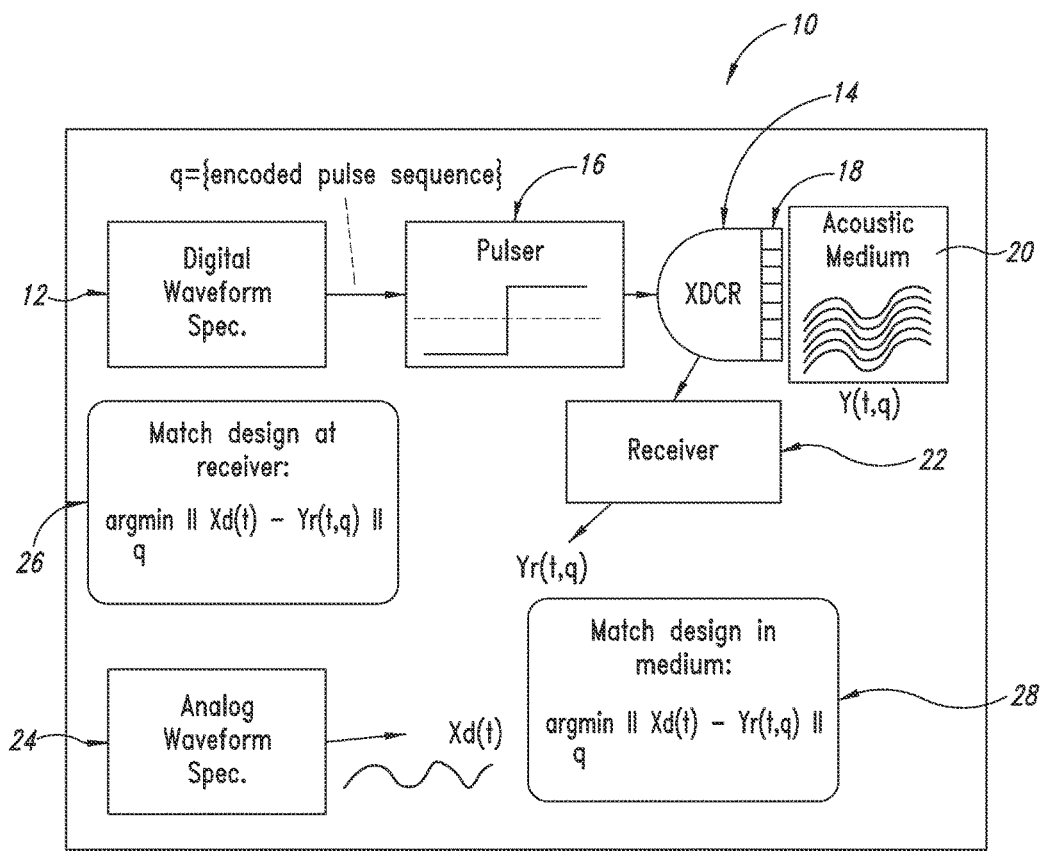
FIG. 1 is a first implementation of the present disclosure directed to one-way and two-way transducer compensation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with digital-to-analog converters and water tanks as discussed herein have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases in "one implementation" or "in an implementation" in various places throughout the specification are not necessarily all referring to the same implementation. Furthermore, the particular features, structures, or characteristics may be combined in any suitable manner in one or more implementations.

The encoding methods and system disclosed herein require knowledge of the transducer element's impulse response (IR). An impulse response estimation method is disclosed and the results of the method are used to introduce encoding algorithms that optimize tri-state pulser sequences. The encoding algorithms are based on constrained deconvolution concepts from communications science known as "equalizers," combined with a hybrid pulse-width modulation (PWM) symbol modulation and quantization scheme. Acoustic water-tank experiments with a Philips L7-4 transducer demonstrate fidelity of −21.7 dB normalized RMS error (NRMSE) in reproducing a windowed Linear Frequency Modulation (LFM) sweep signal.

The tri-state encoding concept disclosed herein has been implemented on the Vantage Ultrasound System manufactured by Verasonics, Inc. Redmond, Wash. (USA). In contrast to a digital-to-analog converter (DAC) driving linear RF amplifiers, the tri-state transmitter architecture of the present disclosure requires non-obvious selection of its pulse sequence to achieve fidelity to a continuous-valued design waveform. The process demonstrated here exploits the high transmitter clock frequency (with respect to transducer bandwidth) to achieve that goal.

Transmitter Description

A brief description of the transmitter operation is given. The usage models which dictate the mathematics of the problem are described. The estimation and encoding algorithms are then introduced into an ultrasound system. The experimental approach implementing the algorithms is documented, and results are then discussed.

The Vantage Ultrasound System transmitter developed by Verasonics, Inc., allows specification of arbitrary sequences of the three voltage levels [+V,0,−V] at 4 nsec clock intervals. Each acquisition event may have sequences unique to each transducer element on a transducer head and unique to that event. The sequences may be of arbitrary length, subject to complexity of the waveform, memory limitations, and power supply capacity. A choice of internal storage formats helps economize transmitter memory usage.

A restriction in pulse sequence selection is a 3-clock minimum state dwell required to enter a positive, negative, or zero voltage level state. Another restriction is that the achieved voltage is approximately the 5-clock running average of the voltage of the achieved state.

Usage Models

The fidelity metric employed by the encoder's optimizing objective function is a design choice that depends on the usage model or operating mode or scenario, all of which are specific to the application. Those metrics considered here include (1) closeness of the reference waveform (in normalized RMS error) to acoustic pressure; (2) closeness of the reference waveform's predicted acoustic pressure to that actually achieved; and (3) closeness to the stationary component of the RF signal present at the input to the analog receiver gain stage. The first two metrics are discussed herein as problems that are labeled here as the one-way transducer compensation problem, and the one-way DAC synthesis problem, respectively. Further, their two-way counterparts analogously compare the reference signal to received data, rather than acoustic pressure.

An illustration of the present disclosure configured to address the one-way and two-way transducer compensation problem is illustrated in FIG. 1. An illustration of the proposed method or process solving the two-way DAC synthesis usage model is given in FIG. 2.

In FIG. 1, components of a transmit- and receive-channel pair for a system 10 are shown to illustrate the one- and two-way transducer compensation usage models. Shown in FIG. 1 is a Digital Waveform Spec. component 12, which incorporates the encoded binary or trinary pulse sequence of symbolic positive, negative, or quiescent values, defined at uniformly spaced discrete clock time intervals. Also shown is an XDCR 14, which is the ultrasound transducer probe structured to produce and receive acoustic waveforms. The XDCR 14 contains elements to which the transmit-receive-channel pair is connected. A Pulser 16 is interposed between the Digital Waveform Spec. component 12 and the XDCR 14 and incorporates a transmitter circuit that is structured to translate the trinary or binary pulse sequence to the actual physical transmit voltage events that, in turn, energize the connected transducer probe elements 18 over a continuous time support during the transmission.

An Acoustic Medium 20 shown in FIG. 1 is the physical space subject to acoustic interrogation by the system 10 during ultrasonic imaging or measurement (for example, biological tissue or industrial material). A Receiver 22 is coupled to the XDCR 14 and is structured to convert voltage signals induced by the transducer probe XDCR 14 on its electrical ports during reception of acoustic signals to a suitably conditioned digital representation Yr(t,q), which is defined on time samples t for a specific transmit sequence q. An Analog Waveform Spec. component 24 is shown in the lower left corner, which is the desired design of the waveform subject to reproduction by the system 10 at meritorious fidelity. The functions "Match design at receiver" 26 and "Match design in medium" 28 specify the mathematical criterion defining the two-way and one-way transducer compensation usage models, respectively.

Figure 2:
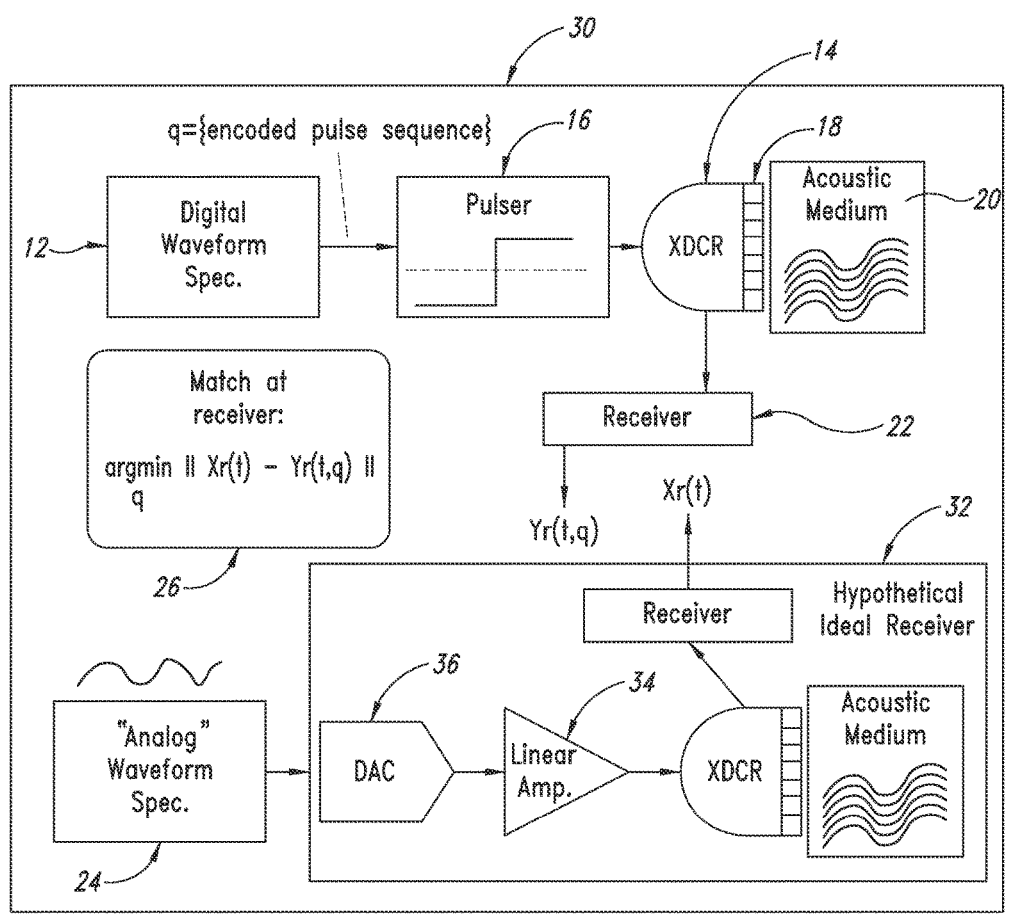
FIG. 2 is a second implementation of the present disclosure directed to a two-way DAC synthesis usage model.

In FIG. 2, the components of a transmit- and receive-channel pair for a system are 30 shown to illustrate the two-way DAC synthesis usage model. In addition to components of FIG. 1, (which are referred to with the same reference numbers) the components in FIG. 2 include a Hypothetical Ideal Receiver 32 and a Linear Amplifier 34. The Receiver 32 is comprised of a digital-to-analog converter DAC 36. The Linear Amp 34 is similar to the Pulser component 16, but it operates faithfully on pulse sequences having levels of arbitrarily high precision rather than sequences of binary or trinary symbolic value.

Figure 3:
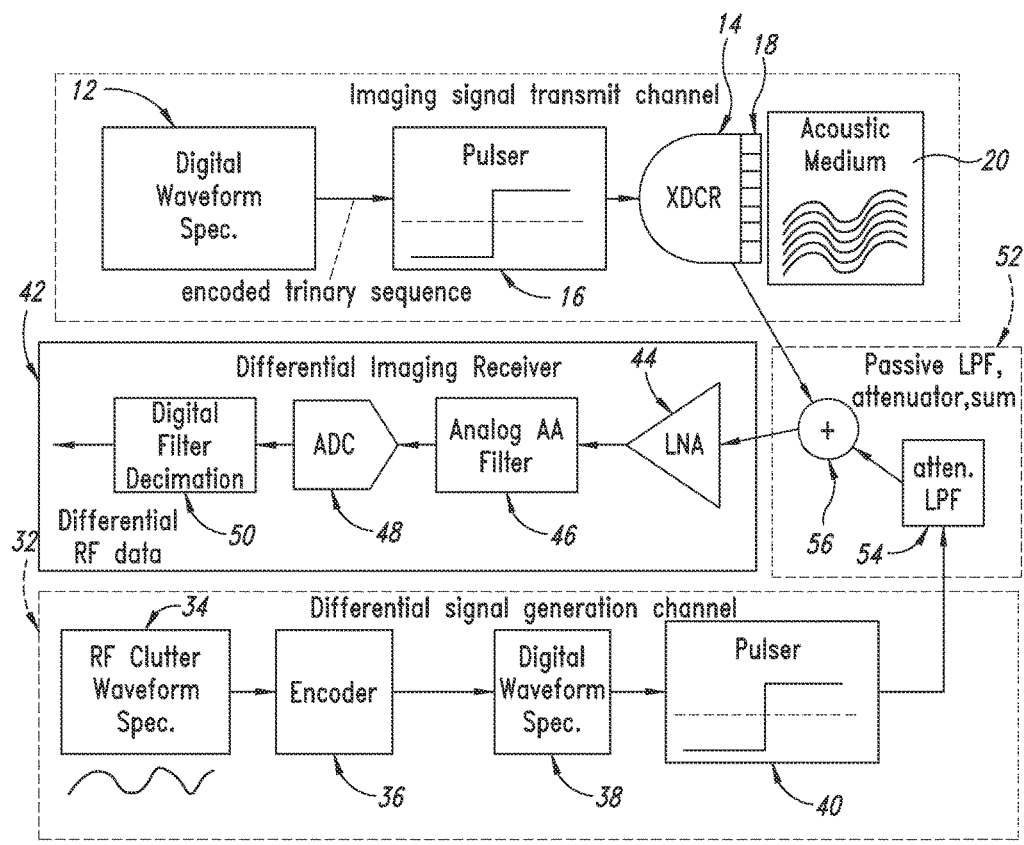
FIG. 3 is a third implementation of the present disclosure directed to an arbitrary waveform generation method for synthesizing stationary RF signals in a differential imaging scheme.

A third usage model uses the arbitrary waveform generation technique to synthesize stationary RF signals, considered clutter, in order to cancel them at the input to the analog receiver. This forms a differential acquisition scheme for clutter-limited applications such as Doppler imaging. This mode of operation requires additional mixing network hardware in the form of a passive low pass filter (LPF), attenuator, and summation network. FIG. 3 illustrates this variation of the method. An alternative implementation employs switchable components in the mixing network to achieve variable attenuation levels, so that the same transmitter can be used for the imaging signal path and the clutter waveform synthesis path.

In FIG. 3, transmitter and receiver components of the system 30 are shown configured as a channel in the RF-synthesis and differential acquisition usage model. In addition to the components of FIG. 1 (shown with the same reference numbers), the system 30 of FIG. 3 includes a Differential signal generation channel 32 comprised in part of an RF Clutter Waveform Spec. 34, which represents a digital sequence of nominally expected RF samples due to a transmit-receive acoustic interrogation of the Acoustic Medium 20. This is typically measured in a previous acquisition cycle. An Encoder 36 is shown, which is an embodiment of the entirety of FIG. 4. Its output "Tri-state pulse sequence" is provided as an input for the element Digital Waveform Spec. 38, which outputs to a Pulser 40.

FIG. 3 also includes a Differential Imaging Receiver 42 comprised in part of low-noise amplifier LNA 44, which is circuitry structured to amplify received electrical signals induced on the electrical port of the transducer XCDR 14 due to acoustic pressure signals in the acoustic medium 20. An Analog AA Filter 46 is configured to provide anti-aliasing functions on the received voltage signals, and the output is received at an Analog-to-Digital Converter 48. A Digital Filter Decimation component 50 is provided that is structured to accomplish data reduction commensurate with transducer bandwidth.

FIG. 3 further includes a Passive LPF, attenuator, sum component 52 comprised of an attenuated Low Pass Filter LPF 54, which is analog circuitry to filter and attenuate received electrical voltage signals. A summer element 56 labeled "+" is structured to execute analog summation of two electrical voltage signals, one from the XDCR 14 and the other from the LPF 54.

Algorithm

The presented method of waveform encoding is motivated by the concept of symbol "equalization" when communicating through band limited channels. This concept is generalized here to the symbol-block case. This means the entire sequence of transmit pulses (for a channel) are optimized jointly, rather than serially as individual pulses. This problem of symbol inference might be interpreted as a deconvolution constrained to discrete-valued inputs. An important difference between the communication problem and the use of the equalization concept here, is the performance metric. In the communication problem, a true symbol sequence exists against which performance can be measured (in terms of symbol error rate). In the transmitter problem addressed here, there exists no "true" symbol sequence, and the objective is only to fit the acoustic pressure generated by the transducer (or receiver data) as well as possible to the design waveform, subject to allowed inputs (symbols).

Process Architecture and Operation

Figure 4:
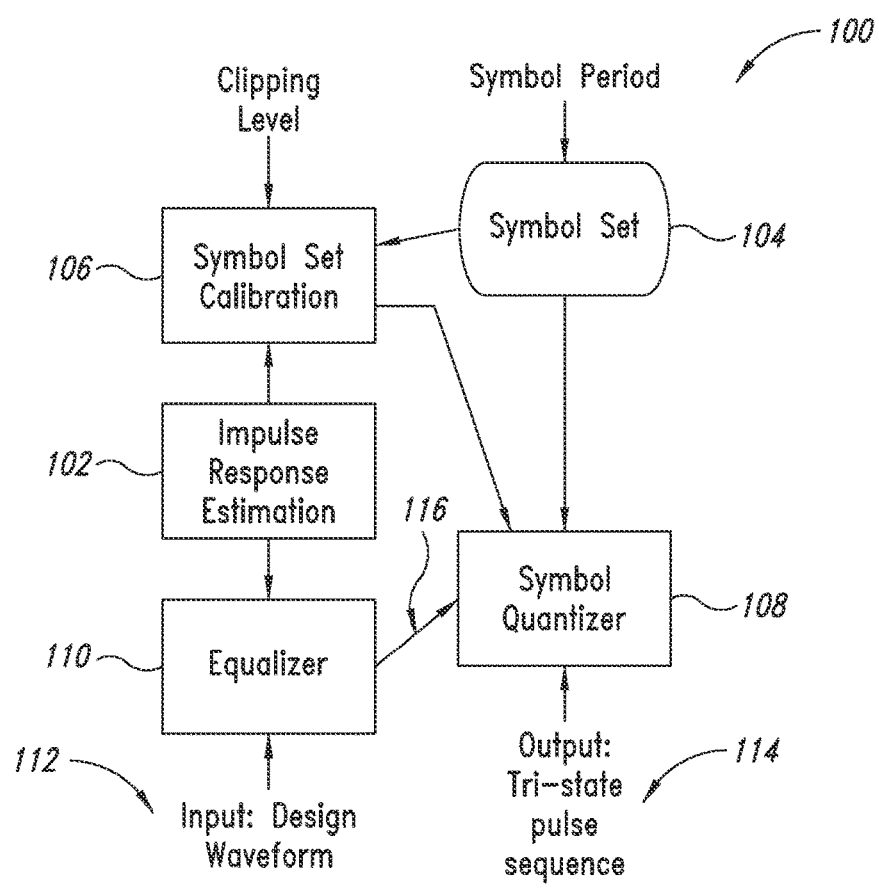
FIG. 4 is an architectural diagram of an encoding process in accordance with the present disclosure.

The components and operation of the encoding process 100 are shown in the architecture diagram of FIG. 4. These components include IR estimation 102, Symbol Set definition 104, Symbol Set calibration 106, Symbol Quantization 108, and Equalization 110. The input to the process 100 is the reference design waveform 112, represented by high precision samples of an analog signal or function. The output of the process 100 is a tri-state pulse sequence 114 suitable for control of the transmitter pulser circuitry. Note the term "symbol" may refer to members of the many-valued Symbol Set 104, or the binary/trinary transmitter symbol values. Where this distinction is important, the binary/trinary transmitter are always clearly identified as such.

Impulse Response Estimation

Initially, the architecture requires that IR estimation be conducted for each transmit element according to the signal path determined by the usage model. The impulse response estimation 102 is formulated as convolution implemented in a linear statistical model and solved by least-squares theory. This technique is demonstrated in prior work on underwater acoustic data at sonar frequencies. Here, the model has as input a known sequence of transmitted pulses collected in a vector q, and formed into a Toeplitz matrix. Unknown parameters comprising the impulse response are represented by the vector $h=[h(1), \ldots, h(L)]^T$, in $$Y=Qh+e \quad (1)$$

where the modeling error is represented by e, the model data is the Toeplitz matrix T(q) of the zero-padded vector q, defined as $$Q = \begin{bmatrix} q(1) & 0 & \cdots & 0 \\ \vdots & q(1) & & \vdots \\ q(N) & \vdots & & \\ 0 & q(N) & \ddots & 0 \\ & 0 & \ddots & q(1) \\ \vdots & & & \vdots \\ 0 & & \cdots & 0 & q(N) \end{bmatrix} \quad (2)$$

and where the measurement $Y=[y(1), \ldots, y(N+L-1)]^T$.

One means of solving (1) is by the pseudoinverse, which gives the estimate of impulse response vector h as $$\hat{h}=Q^+Y \quad (3)$$

Parameter Selection

Parameters needed include clipping level and symbol period, d. A design variable required by the architecture is the symbol period, which is typically based on the nominal transducer center frequency. Each symbol is comprised of several transmit clock periods and therefore several tri-state voltage instances. A typical choice of symbol period corresponds to ¼ the nominal center frequency. For example, a twelve-clock symbol period would correspond to 5.2 MHz considering a 250 MHz clock rate. Additionally, the symbol period is chosen by judicious engineering assessment during choice of the symbol set 104, which determines the number of PWM levels available. The hypothetical twelve-clock symbol period permits 25 PWM levels, including the zero-voltage level. The two consequences of a symbol period choice form a design tradeoff; a larger symbol period provides more PWM levels, at the cost of reduced symbol rate.

FIG. 5A shows the symbol set used for the 5 MHz center-frequency transducer probe (Philips L7-4 model) in the experiment in the sequel. In FIG. 5A the array of waveforms corresponding to the symbols in the Symbol Set 104 is shown, ordered according to achieved transmit energy at the transducer output, as indicated by the axis "Duty Cycle." In this sense, duty cycle is a generalization of the pulse-width-modulation (PWM) concept, and a means of specifying the energy induced by each symbol. Each symbol waveform has values defined at one of the trinary values of [+1, 0, −1] for each transmit clock in the symbol period. The set of 12 symbols is replicated at an equivalent range of negative Duty Cycles, with defined trinary transmit levels negated correspondingly, to achieve the negative phase acoustic transmission. With the inclusion of the all-zero symbol waveform, the resulting Symbol Set 104 contains 25 waveforms, each associated with a distinct symbol that can be mapped to transmit energy. Compared to this example, Symbol Set designs for higher-frequency transducer probes will have fewer available symbols, while lower frequency probes can have more symbols.

In FIG. 5B the resulting acoustic waveform corresponding to each symbol is shown. This illustrates the ordering of achieved acoustic energy, qualitatively validating the underlying principle of the technique.

The clipping level is a companion parameter to the symbol set. It adjusts the overall level, with respect to the equalizer output, of the calibration gains when they are applied in the symbol quantizer. In this way the range of the equalizer output is fit within the quantizer window. The optimum clipping level is found empirically, by iteration, for each reference design waveform encoded, until the minimum mean square approximation error between the reference and synthesized waveforms is found.

Symbol Set Calibration

The symbol set calibration component 106 of the architecture is configured to determine a gain mapping between each symbol available in the symbol set 104, and its equivalently-weighted Dirac impulse, as seen at the output of the transducer or channel model. This is achieved as the least-squares solution for the gain variable g(k) in $$S_k = g(k)S_0 + e \quad (4)$$

where the vector $S_k$ represents the response of the impulse response model when convolved with the k-th symbol, and vector $S_0$ represents the response to the prototype reference symbol, typically chosen to be the largest-bandwidth symbol.

Symbol calibration only needs to be determined once for a give symbol set and impulse response.

Equalization

The equalizer component 110 performs a deconvolution of the desired reference design waveform against a model derived from the estimated impulse response of the usage model's signal path. The output 116 of the equalizer 110 comprises a sequence r of "soft" symbols, which represent continuously-valued Dirac impulse weights. When these are convolved with the IR model, the result approximates the specified design waveform.

In analogy to the IR estimation, a modified Toeplitz matrix formed from the estimated IR vector is used as part of a Linear Statistical Model describing convolution, so that the reference design waveform $$W = [w(1), \ldots, w(L+Pd-1)]^T \quad (5)$$

is interpreted as the measurement in $$W = H_d r + e \quad (6)$$

where the model matrix $H_d$ is the column-decimation of the Toeplitz matrix T(h) associated with zero-padded IR response vector h, $$H_d = \begin{bmatrix} h(1) & 0 & \cdots & 0 \\ \vdots & & & \vdots \\ h(L) & \ddots & h(1) & \\ 0 & & \ddots & 0 \\ & 0 & h(L) & \ddots & h(1) \\ \vdots & & & \vdots \\ 0 & & \cdots & 0 & h(L) \end{bmatrix} \quad (3)$$

The decimation factor by which a subset of columns of $H_d$ is retained from the standard Toeplitz matrix corresponds to the symbol period d. For example, a symbol period of 12 transmit clocks means every 12th column of the standard Toeplitz matrix H=T(h) is retained as a column of $H_d$. The unknown parameter vector (to be determined) is the collection of soft symbols in the vector r $$r = [r(1), \ldots, r(L/d+P-1)]^T. \quad (8)$$

The solution for the sequence of soft symbols in parameter vector r can be found by the pseudoinverse as $$\hat{r} = H_d^+ W \quad (9)$$

Another Implementation.

For some design waveforms, an iterative extension (here labeled as the "conditional equalizer") may give better equalization performance. In this method, the result of the equalization is quantized according to the Symbol Quantization step 108 in the sequel. The resulting symbol sequence p is the applied to the impulse response in the new model notated as $$W = H_d p + e \quad (10)$$

Then, sequentially for each element of the vector p, the element is replaced with the symbol from the symbol set that gives the least squares residual fitting error. This is determined by exhaustive search of the symbol set, and repeated for all elements of the vector p. If the incumbent values of the vector p give the lowest error, then the process stops; otherwise, it is repeated. The symbol set 104 used in this iterative process may be of a different symbol period than that used initially, with appropriate sizing and decimation factors used.

Another Implementation.

For certain reference design signals, another variant of the equalization process is used for better performance. This method, labeled here as "iterative refinement," encodes the error signal resulting from the baseline algorithm. That is, the signal formed as the difference between the reference design signal and the achieved replica in the baseline algorithm, is treated as a new signal for synthesis by the algorithm; the motivation being that the error signal is smaller than the original signal subjected to encoding. After the error signal is encoded into a trinary sequence, its encoding is subtracted from the pulser sequence encoding of the previous stage, subject to saturation of the trinary value range. The process is terminated when the improvement in error stops.

Symbol Quantization

The symbol quantizer component 108 is configured to choose, for each soft symbol output sample 116 of the equalizer 110, the closest symbol of the symbol set, in terms of the gain mapping determined in the calibration step. Thus, it chooses the g(k) closest among each k, to the soft symbol being mapped. The sequence of symbols is then converted into their constituent trinary pulse sequences which are concatenated to a single sequence. This tri-state pulser sequence 114 is the output of the symbol quantizer 108.

EXPERIMENTAL RESULTS

A water tank experiment was conducted to validate performance of the IR estimation and tri-state encoding process.

Two-Way Experiment Configuration

Figure 7:
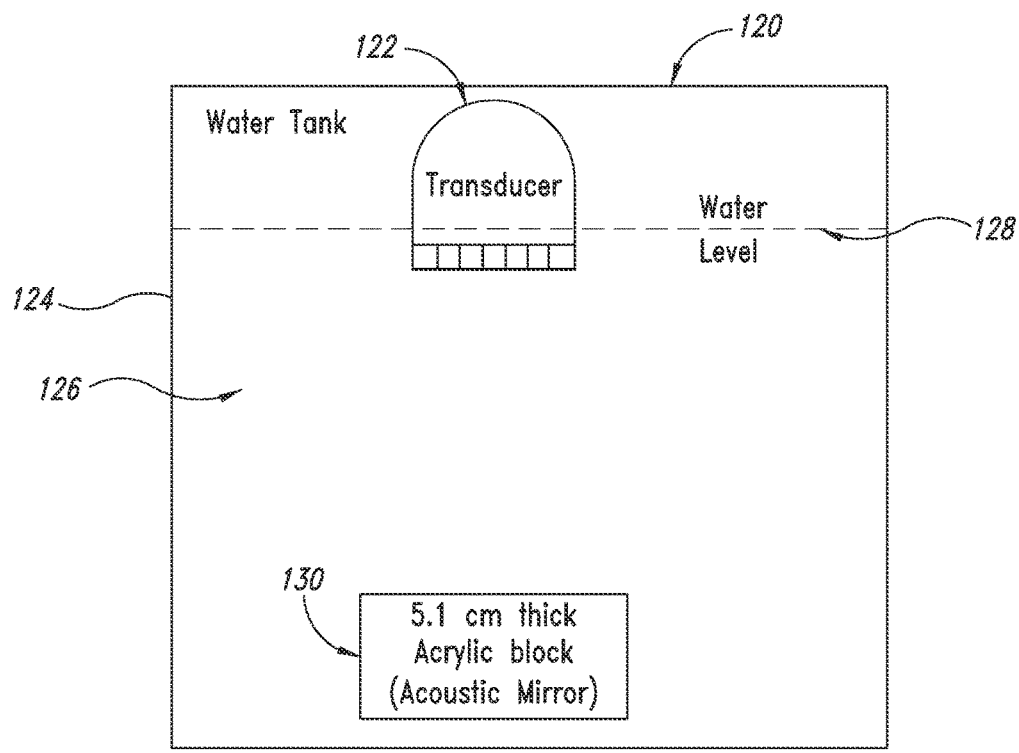
FIG. 7 is an exemplary illustration of the method of the present disclosure implemented in a water tank.

The experiment consisted of a Philips L7-4 Transducer fixed in a water tank, and pointed directly at an acrylic block of 5.08 cm thickness, as shown in FIG. 7. The Verasonics Vantage acquisition system is connected to the transducer.

Impulse Response Estimation Experiment

Figure 6:
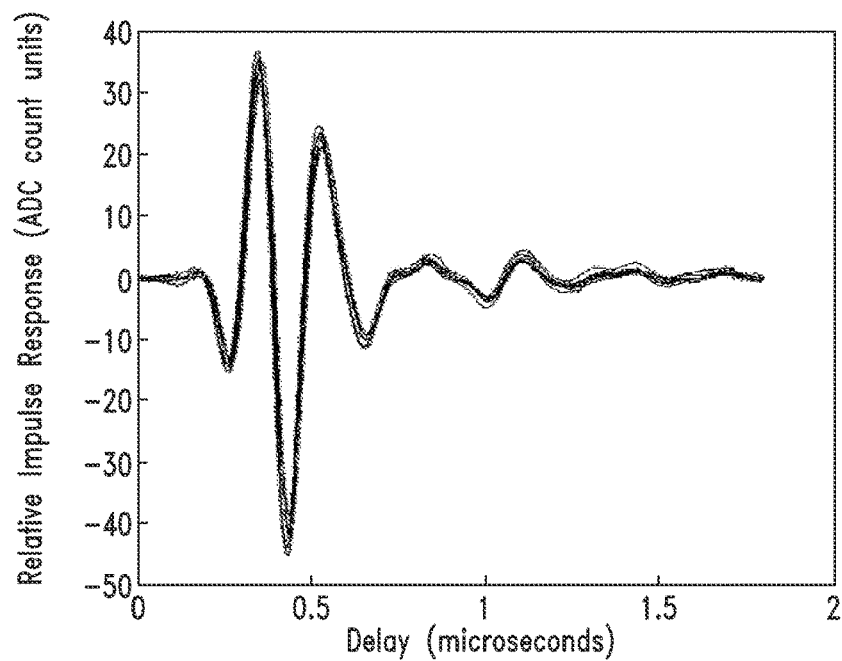
FIG. 6 is an illustration of a joint IR estimate as well as individual estimates for a plurality of sequences.

In the transducer impulse response estimation experiment 120 shown in FIG. 7, a transducer element channel 122 is chosen for transmission and subsequent reception. The transducer element 122 is placed inside a tank 124 constructed to hold water 126 at a specified water level 128. An acrylic block 130 at the bottom of the tank and under the water 126 is configured to act as an acoustic mirror, reflecting substantially without modification the transmitted signal back to its source. Eight different pseudorandom pulse trains were transmitted as probing sequences, in separate acquisition events. The joint IR estimate as well as individual estimates for each sequence, were computed. These are shown in FIG. 6. The impulse response estimates corresponding to each transmitted probing sequence are superimposed in the graph to show their similarity. This qualitatively shows their independence from probe sequence choice and thereby demonstrates validity of the estimation technique described.

LFM Synthesis Test

Waveform encoding was demonstrated on an example large time-bandwidth waveform, a Linear Frequency Modulated (LFM) pulse of 10 microsecond duration. Taylor weighting was applied to the waveform envelope. The instantaneous frequency ranged from 3.5 MHz to 6.5 MHz. In the two-way transducer compensation usage model, the normalized RMS error between the reference waveform and the measured waveform after receiver filtering was −21.7 dB.

SUMMARY

In summary, a device for arbitrary waveform generation by a tristate pulser is disclosed, with application for three usage models.

For certain reference design signals, another variant of the equalization process is used for better performance. The algorithm commonly known to engineers skilled in the art of communications science or operations research as "Viterbi", Dynamic Programming, or Maximum-Likelihood Sequence Estimation (MLSE), is applied through a novel IR shortening procedure. The shortening procedure is accomplished by a factorization design based on a specific arrangement of deconvolution principles. The purpose of the IR-shortening procedure is to enable practical application of the MLSE approach; without this procedure the computation complexity would be intractable in the invention, due to typically expected sizes of the associated IR vector. The benefit of applying the MLSE procedure, in most practical cases, is significantly improved fidelity over that of the other implementations.

Considering the Definitions h=transducer impulse response, decimated to a sample rate (denoted here as $F_{dwell}$) of period equal to the transmitter state dwell, i.e., the minimum number of transmitter clocks needed to assert a transmitter voltage state;

L=length of h;

W=reference design signal, with zero pads at its front and end of practically suitable lengths, for example L/4 and 2*L respectively;

$L_w$=length of W vector;

H=the Toeplitz-structured matrix referenced earlier, whose first column is the h vector zero-padded to length of $L_w$−2L, and whose columns are decimated to a rate of $F_{dwell}$; and B=reference impulse response (RIR) of a suitable chosen lowpass or bandpass finite-impulse-response (FIR) filter, with passband aligned with that of the transducer, and of length suitable for practical solution by the MLSE algorithm, the algorithm steps are then:

1. solve for vector r, using the pseudoinverse or other suitable method, in the least-squares problem H*r=W, with r representing the infinite-precision driving signal for the transducer when the transducer output is the reference waveform W;
2. convolve vector B with vector r to generate an abstracted signal y=conv(r, B);
3. Using the MLSE algorithm, infer the tri-state sequence of symbols $\{Ik\}=I_{MLSE}$ over a duration that includes the time-support of y, which optimally approximates abstracted signal y through convolution with the RIR vector B as the vector $y_{MLSE}$=conv($I_{MLSE}$, B).

Repeat the steps 1-3 with differently-scaled replicas of the RIR vector B, over a suitable practical range of scalings, until the scaling of B giving the lowest-error approximation $y_{MLSE}$ is found. The tri-state sequence voltage sequence $I_{MLSE}$ corresponding to this scaling instance is then selected as the transmitter encoding produced by this implementation.

Figure 8:
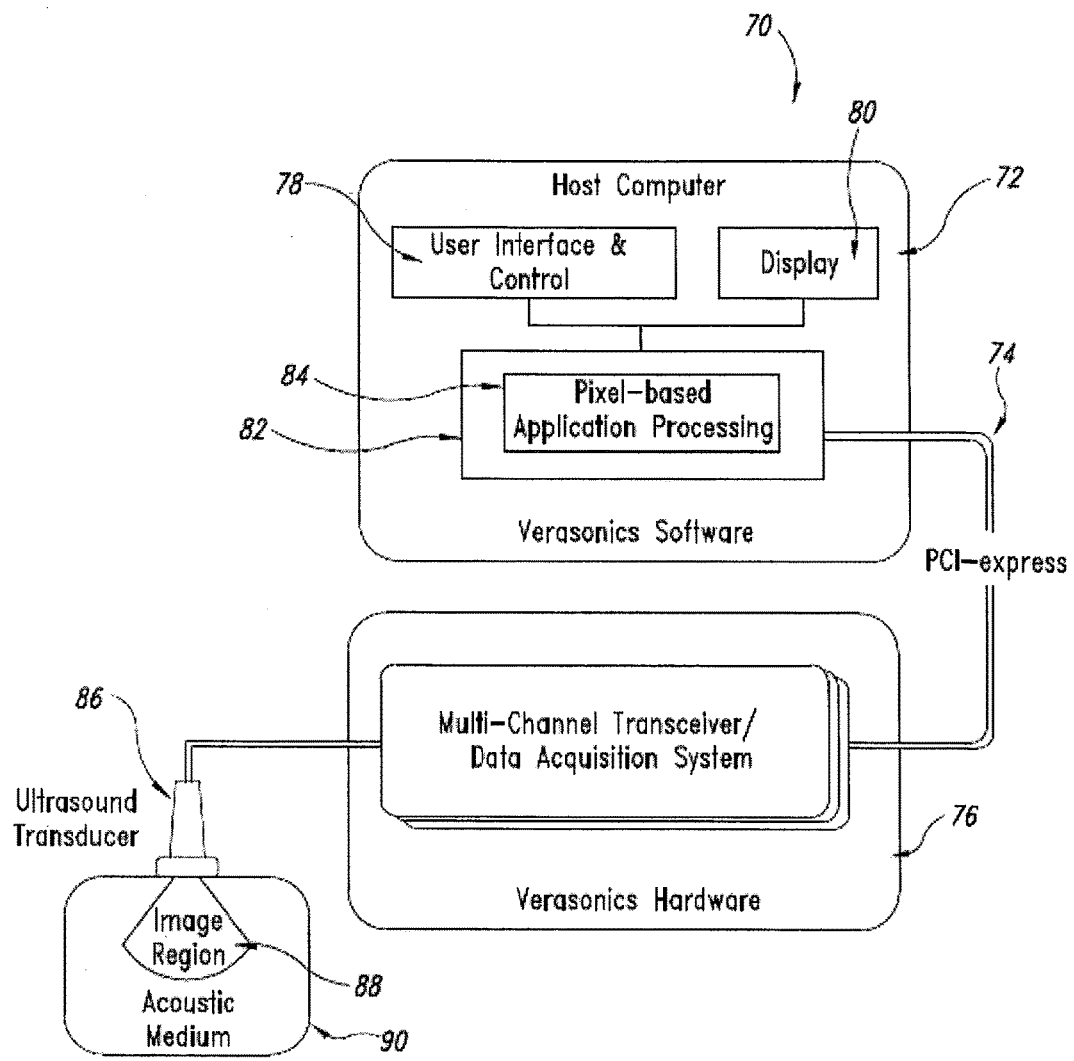
FIG. 8 illustrates a high-level representation of the system architecture for the processes of the present disclosure.

FIG. 8 is a system level block diagram that represents a high-level system architecture 70 for implementing the processes of the present disclosure. It is to be understood that this is merely one representative embodiment, and the illustrated architecture 70 is not a requirement for all embodiments of the present disclosure.

The architecture 70 includes a host computer 72 coupled via a PCI-express 74 to a multi-channel transceiver and data acquisition system 76. The host computer 72 has a user interface and control 78, and a display 80, both coupled to a processor 82 that utilizes the pixel-based application processing software 84. The multi-channel transceiver and data acquisition system 76 hardware are coupled to an ultrasound transducer 86 that is used to image a region 88 in an acoustic medium 90. Because these components are readily commercially available, they will not be described in detail herein.

Pixel Oriented Processing

Figure 9:
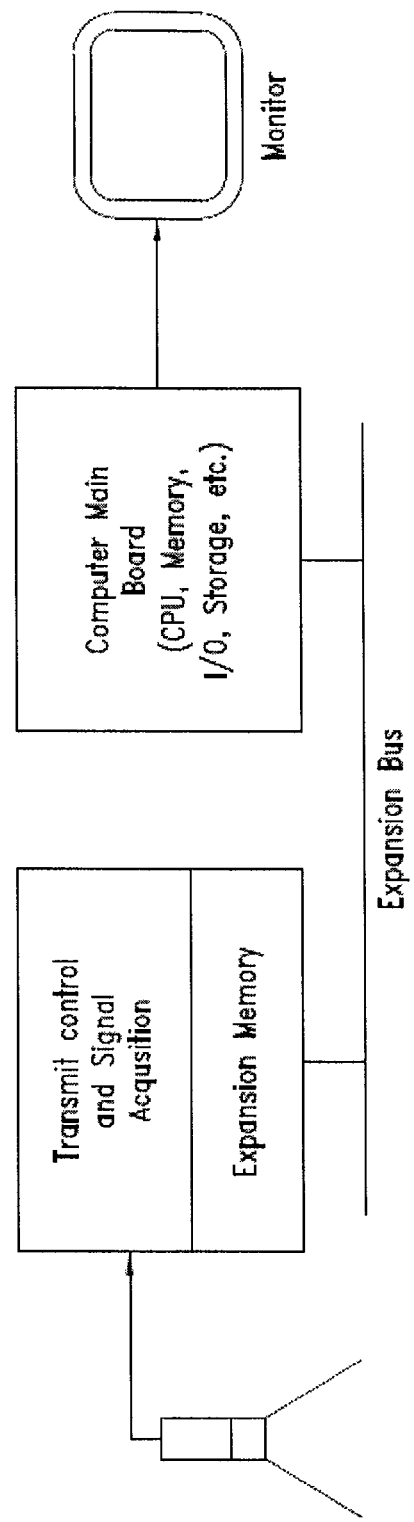
FIG. 9 is a schematic representation of a software-based architecture of one embodiment of pixel-oriented processing.

The software-based method and system architecture in accordance with one embodiment of the present disclosure implements all real-time processing functions in software. The proposed architecture is shown schematically in FIG. 9.

The only custom hardware component in the software-based system is a plug-in module to the expansion bus of the computer that contains the pulse generation and signal acquisition circuitry, and a large block of expansion memory that is used to store signal data. The signal acquisition process consists of amplifying and digitizing the signals returned from each of the transducer elements following a transmit pulse. Typically, the only filtering of the signals prior to digitization, other than the natural band-pass filtering provided by the transducer itself, is low pass, anti-aliasing filtering for A/D conversion. The signals are sampled at a constant rate consistent with the frequencies involved, and the digitized data is stored in memory with minimal processing. The straight-forward design of the signal acquisition allows the circuitry to be implemented with off-the-shelf components in a relatively small amount of board area.

Figure 10:
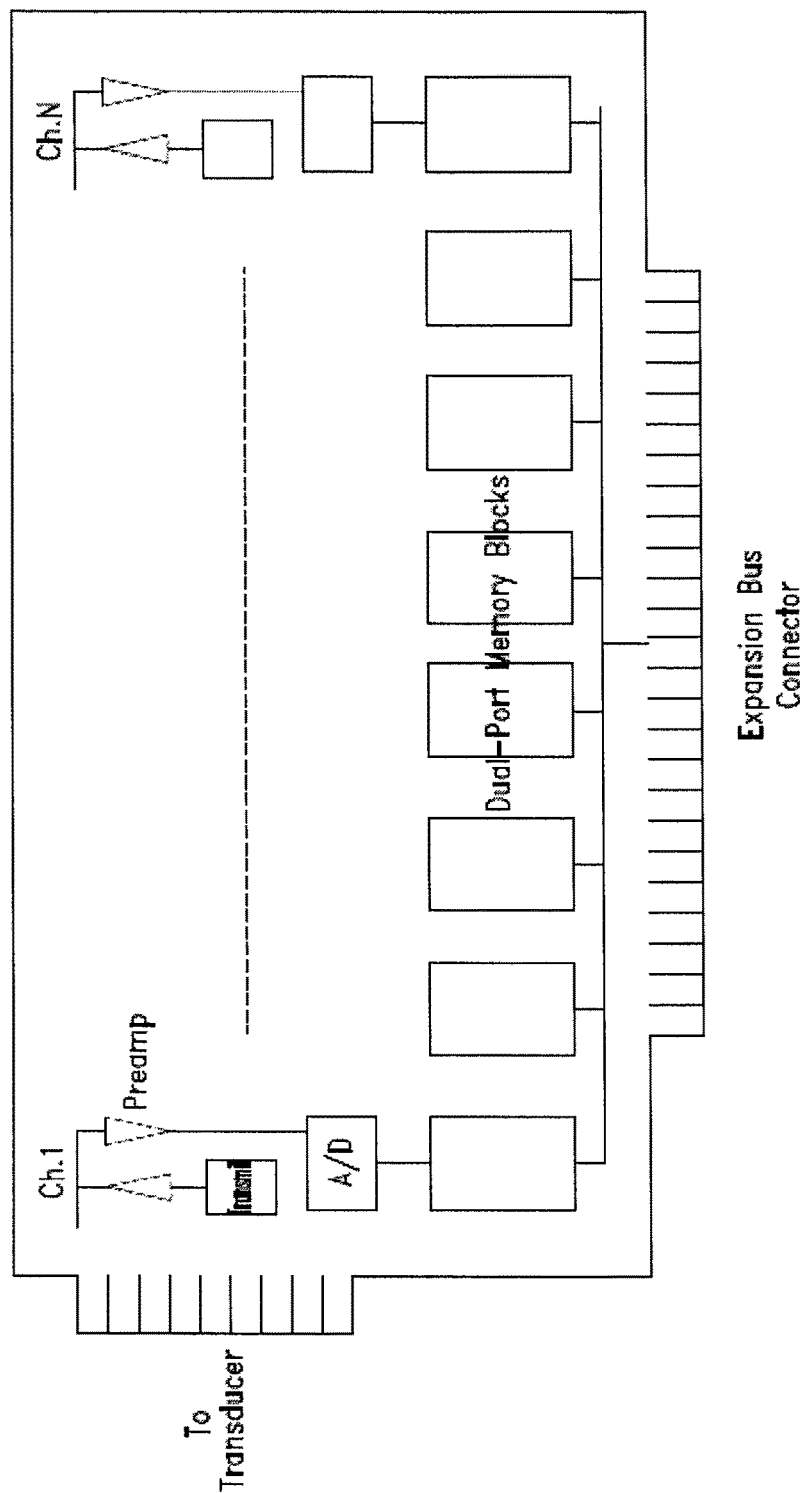
FIG. 10 is a diagram of a plug-in module formed in accordance with the pixel-oriented processing.

A more detailed look at the plug-in module is shown in FIG. 10. Multiple acquisition channels are shown, each composed of a transmitter, receiver pre-amplifier, A/D converter, and memory block. During receive, the transducer signals are digitized and written directly to the individual memory blocks. The memory blocks are dual-ported, meaning they can be read from the computer side at the same time acquisition data is being written from the A/D converter side. The memory blocks appear as normal expansion memory to the system CPU(s). It should be noted that the size of the plug-in module is not limited to the normal size of a standard computer expansion card, since the system is preferably housed in a custom enclosure. Also, multiple plug-in modules can be used to accommodate a large number of transducer elements, with each module processing a subset of the transducer aperture.

The components for the plug-in module, including amplifiers, A/D converters and associated interface circuitry, and the needed components for transmit pulse generation and signal acquisition are readily commercially available components and will not be described in detail herein. The memory block needed for RF data storage of echo signals obtained from received echoes is essentially the same circuitry as found in commercially available plug-in expansion memory cards, with the addition of a second direct memory access port for writing the digitized signal data. (The received echo signal data is generally referred to as RF data, since it consists of high frequency electrical oscillations generated by the transducer.) The memory is mapped into the central processor's address space and can be accessed in a manner similar to other CPU memory located on the computer motherboard. The size of the memory is such that it can accommodate the individual channel receive data for up to 256 or more separate transmit/receive cycles. Since the maximum practical depth of penetration for round trip travel of an ultrasound pulse in the body is about 500 wavelengths, a typical sampling rate of four times the center frequency will require storage of as many as 4000 samples from an individual transducer element. For a sampling accuracy of 16 bits and 128 transducer channels, a maximum depth receive data acquisition will require approximately one megabyte of storage for each transmit/receive event. To store 256 events will therefore require 256 MB of storage, and all totaled, a 128 channel system could be built on a few plug-in cards.

Another aspect of the software-based ultrasound system is the computer motherboard and its associated components. The motherboard for the proposed design should preferably support a multi-processor CPU configuration, for obtaining the needed processing power. A complete multi-processor computer system, with power supply, memory, hard disk storage, DVD/CD-RW drive, and monitor is well-known to those skilled in the art, can be readily commercially purchased, and will not be described in greater detail.

A software-based ultrasound system must truly achieve "high-performance," meaning image quality comparable to existing high-end systems, in order to provide a significant benefit to the health care industry. This level of performance cannot be achieved by simply converting the flow-through processing methods of current systems to software implementations, since a simple addition of all the processing operations needed for one second of real-time imaging in the flow-through architecture gives a number that exceeds the typical number of operations per second currently achievable with several general purpose processors. Consequently, new processing methods are required to achieve a much greater efficiency than the flow-through methods.

Figure 11:
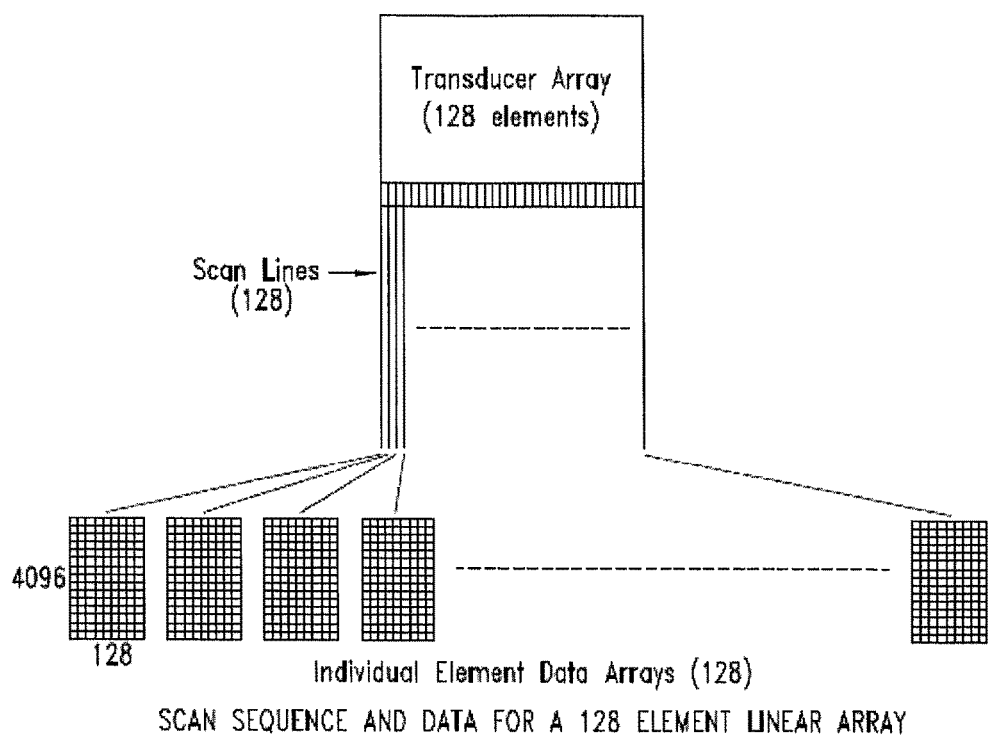
FIG. 11 is a schematic representation of the acquisition data for a 128 element linear array formed in accordance with the pixel-oriented processing.

In one embodiment of the software-based ultrasound system architecture of the present invention, the input data for signal and image processing consists of the set of RF samples acquired from individual transducer channels following one or more transmit events. As an example, let us consider a typical 2D imaging scanning mode with a 128 element linear transducer array, as shown in FIG. 11.

In this case, a 'transmit event' would consist of timed pulses from multiple transducer elements to generate a plurality of acoustic waves that combine in the media to form a focused ultrasound beam that emanates outwards from an origin point on the transducer at a specific element location. Multiple transmit events (128 in all) produce ultrasound beams that are sequentially emitted incrementally across the width of the transducer face, thus interrogating an entire image frame. For each of these transmit beams, the received echo data is collected from each of the 128 receiver elements in the transducer and organized into a data array with each column representing the sampled echo signal received by the corresponding transducer element. Thus, each array has 128 columns, corresponding to the 128 transducer elements, and a number of rows corresponding to the number of samples in depth that were taken (in this case, we will assume 4096 rows resulting in 4096 samples). These 128 data arrays then constitute an RF data set that is sufficient to produce one complete image frame.

It is worth noting that in the flow-through architecture, the RF data set described above does not even exist (at least not all at one time), since the beam and image formation takes place as the data streams in from the transducer. In other words, as the data returns to each element after a transmit event, it is processed and combined (referred to as beam forming) to generate a single RF signal representing the focused return along a single beam (scan line). This RF signal is processed (again in real-time) into echo amplitude samples, which are stored in a memory array. When all beam directions have been processed, the echo amplitude data is then interpolated and formatted into a pixel image for display. Since all processing takes place in real-time, the processing circuitry must be able to 'keep up' with the data streaming in from the transducer elements.

In the software-based architecture of the present invention, all input data is stored prior to processing. This uncouples the acquisition rate from the processing rate, allowing the processing time to be longer than the acquisition time, if needed. This is a distinct advantage in high frequency scans, where the depth of acquisition is short and the sample rate high. For example, a 10 MHz scan head might have a useable depth of imaging of around four centimeters. In this case, the speed of sound in tissue dictates that each of the 128 transmit/receive events acquire and store their data in 52 microseconds, a very high acquisition data rate. In the flow-through architecture, this acquisition data would be formed into scan lines in real-time at high processing rates. In the software-based architecture of the present invention, the storage of RF data allows the processing to take as long as the frame period of the display, which for real-time visualization of tissue movement is typically 33 milliseconds (30 frames/second). For 128 pixel columns (the rough analogy to scan lines), this would allow 258 microseconds of processing time per column, rather than the 52 microseconds of the flow-through architecture. This storage strategy has the effect of substantially lowering the maximum rate of processing compared with the flow-through architecture for typical scan depths.

The storing of input data reduces the maximum processing rates but does not necessarily reduce the number of processing steps. To accomplish this, a new approach to ultrasound data processing is taken. The first step is to recognize that the ultimate goal of the system when in an imaging mode is to produce an image on the output display. An ultrasound image has a fundamental resolution that depends on the physical parameters of the acquisition system, such as the frequency and array dimensions, and can be represented as a rectangular array of pixel values that encode echo amplitude or some other tissue (acoustic) property. The density of this rectangular pixel array must provide adequate spatial sampling of the image resolution. It is recognized that display images need not consist only of rectangular arrays of pixels, but could consist of any arbitrary set of pixels, representing different geometric shapes. The next step is to start with one of the pixels in this image array and consider which sample points in the RF data set contribute to the calculation of this pixel's intensity, and determine the most efficient way of accessing and processing them. This approach is a completely different approach than the one utilized by the current flow-through architecture because only information that contributes to pixels on the display needs to be processed. In the approach of the present invention, a small region on the display image will take less overall processing time than a large image region, because the small region contains fewer pixels. In contrast, the flow-through processing methods must be designed to handle the maximum data stream bandwidths, independent of the image region size.

After processing the pixel array required to adequately represent the ultrasound image, the array can be rendered to the computer display at an appropriate size for viewing. The graphics processor of the computer, requiring no additional CPU processing, can typically carry out this operation, which consists of simple scaling and interpolation.

Figure 12:
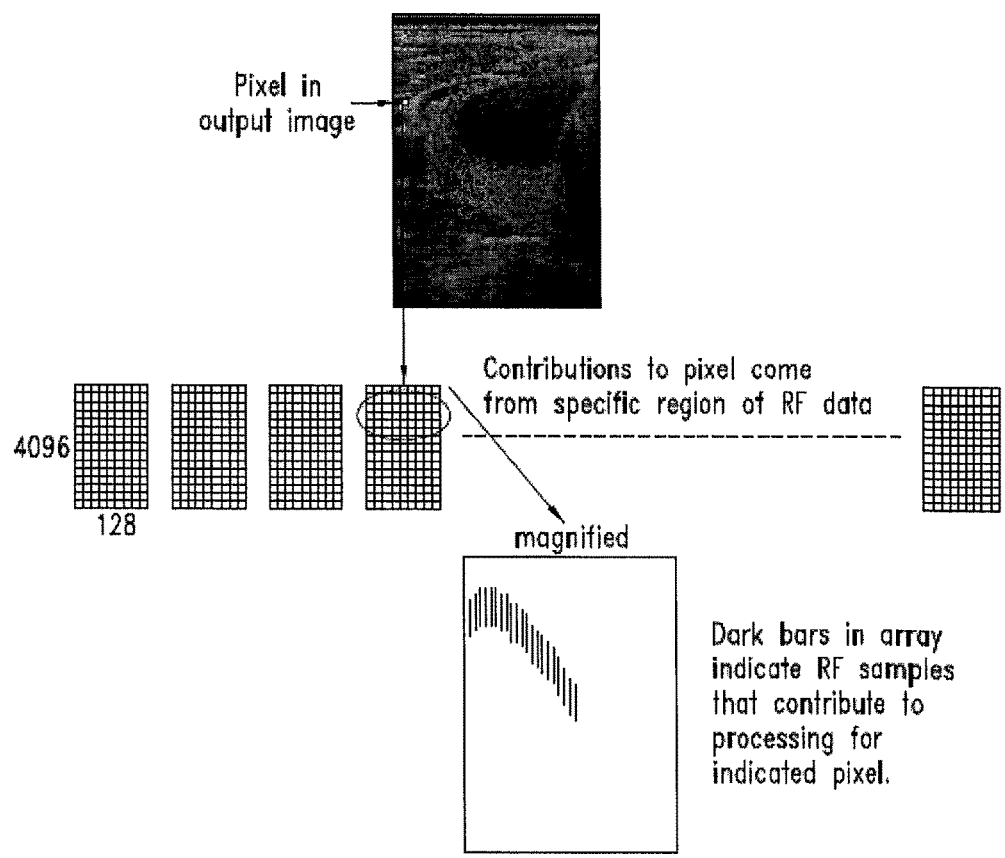
FIG. 12 is an illustration of a pixel mapping process used in pixel-oriented processing.

Next, the processing strategy for a single pixel of the ultrasound image is considered. In this discussion, assume that the objective is to obtain the echo intensity at the corresponding spatial location of the pixel with respect to the transducer array. Other acoustic parameters may be similarly obtained. The first step is to find the region of acquisition RF data containing samples that contribute to the echo intensity calculation. To accomplish this for the scanning method of FIG. 11, first find the acquisition scan line that comes closest to intersecting the pixel location, and then use the corresponding individual element data array. FIG. 12 shows this mapping process for an example pixel in an ultrasound image. In FIG. 12, the indicated pixel maps to the closest acquisition line of the scan, which in this case is scan line 4, whose RF data resides in the fourth individual element RF data array (which represents data collected from the fourth transmit/receive event). More than one RF data array could be chosen as contributing to the pixel signal, but for this example consider only a single data array.

The next step is to map out the region in the individual element array containing samples that contribute to the pixel's intensity calculation. This mapping process is fairly complex and depends on several factors. The transducer elements each have a region of sensitivity that determines how they will respond to a signal returning from a particular point in the image field. For a given image point, only elements that have sensitivities above a predetermined threshold need be considered, since if the sensitivity is too low, an element will not contribute useful information to the pixel's quantity. This sensitivity threshold then determines the number of element data columns to include in the mapped region.

The starting depth of the mapped data region or subset is determined by the arrival time of the returning echo at each individual transducer element. As shown in FIG. 12, the image point signal for elements further away from the image point is captured later in time, and so the starting point of the data set is deeper in memory. Finally, the depth range needed for the data in the mapped data region is dependent on the duration of the transmit pulse generated. Longer transmit pulses will excite the image point for a longer period of time, generating echo signals that extend over a larger depth span of the RF memory.

Fortunately, many of the factors that go into determining the region or subset of mapped data for a given pixel can be pre-computed for a given pixel grid, since this grid does not change over the multiple frames of a real-time image sequence. Using pre-computed factors, the mapped data region for a given pixel can be rapidly and efficiently determined, saving considerable computations during real-time imaging.

After selecting out the subset of pixel mapped RF data, it can be organized into a matrix, $RFP_{nm}$, as shown below.

$$RFP_{nm} = \begin{bmatrix} a_{11} a_{12} & \cdots & a_{1k} \\ a_{21} & & \\ \cdots & & \\ \cdots & & \\ a_{j1} & \cdots & a_{jk} \end{bmatrix}$$

The notation '$P_{nm}$' refers to the image pixel in row n, column m. The matrix columns are the vertical bars of FIG. 12 where it is assumed that the number of samples, j, in each vertical bar is the same. The number of samples, j, is dependent on the range of RF data in time needed for capturing the signal generated by the transmit pulse. The index, k, is the number of channels in the RF data array that have adequate signal strength from to the image point to participate in the intensity calculation.

Accordingly, a system using the foregoing can be implemented to carry out the methods, processes, and algorithms of the present disclosure.

In accordance with the present disclosure, a method is presented that includes providing a binary or trinary sequence of symbolic values that are configured to energize a secondary differential signal generation channel with a corresponding sequence of positive, negative, or quiescent voltage levels at a corresponding uniform sequence of ultrasonic clock intervals; accepting the binary or trinary sequence of symbolic values at the differential signal generation channel; and executing an encoding process at a corresponding ultrasonic receiver apparatus that converts a user-specified waveform into a binary or trinary symbol sequence suitable for the secondary differential signal generation channel to achieve fidelity in the incorporated analog low-pass filter (LPF) in summation with the received signal from the primary imaging signal transmit channel.

In accordance with another aspect of the present disclosure, the method above includes configuring the encoding process to accept a sampled sequence of arbitrary waveform values specified at an arbitrary numeric precision, and to provide fidelity of the specified waveform to the resulting summation of a low-pass filter attenuator output and received transducer probe signal, in order to negate a nominal expected stationary tissue clutter component in the received transducer probe signal, achieving increased dynamic range of Doppler signals present at the analog-to-digital converter.

In accordance with another aspect of the foregoing method, the steps include configuring the encoding process to accept a sampled sequence of arbitrary waveform values specified at an arbitrary numeric precision, and to provide fidelity of the specified waveform to the resulting summation of a low-pass filter attenuator output and received transducer probe signal, in order to negate expected signal artifacts in the received transducer probe signal due to the analog receiver circuitry, achieving increased dynamic range of signals present at an analog-to-digital converter device.

A system is also provided in accordance with the foregoing disclosure that includes at least one ultrasound probe configured to produce acoustic waveforms in an acoustic medium, the probes including ultrasonic transducer elements; a transmitter circuit configured to accept a binary or trinary sequence of symbolic values that are configured to energize at least one ultrasonic transducer element with a corresponding sequence of positive, negative, or quiescent voltage levels at a corresponding uniform sequence of ultrasonic clock intervals; and a corresponding ultrasonic receiver apparatus configured to execute an encoding process to convert a user-specified waveform into a binary or trinary symbol sequence suitable for the transmitter to achieve increased fidelity.

Ideally, the system encoding process is configured to accept a sampled sequence of arbitrary waveform values specified at an arbitrary numeric precision, and to provide fidelity of the specified waveform to the resulting acoustic pressure in an acoustic medium when applied to the transmitter circuit and an attached acoustic transducer probe.

In addition, the encoding process is configured to accept a sampled sequence of arbitrary waveform values specified at an arbitrary numeric precision, and to provide fidelity of the specified waveform to the resulting received ultrasonic signal when applied to the transmitter circuit and an attached acoustic transducer probe, and subsequently received by the ultrasonic receiver apparatus.

In accordance with another aspect of the system, the receiver is a differential receiver that includes a primary imaging transmit channel; a secondary signal generation channel structured to accept a secondary binary or trinary sequence of symbolic values that are configured to energize an incorporated analog filter and attenuator device with a corresponding sequence of positive, negative, or quiescent voltage levels at a corresponding uniform sequence of ultrasonic clock intervals, which are subsequently injected into the primary receiver analog signal path through an analog summation device; and a corresponding ultrasonic receiver apparatus configured to execute an encoding process to convert a user-specified waveform into a binary or trinary symbol sequence suitable to achieve differential reception and imaging.

In accordance with still yet another aspect of the system of the present disclosure, the encoding process is configured to accept a sampled sequence of arbitrary waveform values specified at an arbitrary numeric precision and to provide fidelity of the specified waveform to the resulting signal when applied to a differential signal generation channel transmitter circuit and incorporated low-pass filter and attenuator, and subsequently summed with the signal received by the attached transducer probe and ultrasonic receiver apparatus.

A display device is included that is configured to display blood flow vector velocity imagery from the blood flow vector velocity signals.

In accordance with a method of the present disclosure, the following steps are included: providing a binary or trinary sequence of symbolic values that are configured to energize an ultrasonic transducer element with a corresponding sequence of positive, negative, or quiescent voltage levels at a corresponding uniform sequence of ultrasonic clock intervals; accepting the binary or trinary sequence of symbolic values at the ultrasonic transducer element; and executing an encoding process at a corresponding ultrasonic receiver apparatus that converts a user-specified waveform into a binary or trinary symbol sequence suitable for the transmitter to increase fidelity.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system, comprising:
   an ultrasound probe having transducer elements that are capable of producing acoustic waveforms in an acoustic medium in response to a pulse sequence of positive, negative, or quiescent voltage levels;
   an ultrasonic encoding apparatus coupled to the ultrasound probe, the ultrasonic encoding apparatus capable of executing an encoding process to convert a first waveform into a binary or trinary pulse sequence of symbolic values in accordance with an encoding model, the encoding process including:
   executing a calibration of the symbol set;
   executing an equalizer function based on the probe element impulse response as determined by the signal path for the usage model; and
   executing a symbol quantizer function to produce the binary or trinary pulse sequence of symbolic values; and
   a transmitter circuit coupled to the ultrasound probe and to the ultrasonic encoding apparatus, the transmitter circuit capable of energizing at least one transducer element in the ultrasound probe with the pulse sequence of positive, negative, or quiescent voltage levels in response to receipt of the binary or trinary pulse sequence of symbolic values from the ultrasonic encoding apparatus.

2. The system of claim 1, wherein the ultrasonic encoding apparatus is configured by the encoding model to generate a sampled sequence of arbitrary waveform values specified at an arbitrary numeric precision in response to receipt of the first waveform and in accordance with a one-way transducer compensation usage model.

3. The system of claim 1, where the ultrasonic encoding apparatus is configured by the encoding model to generate a sampled sequence of arbitrary waveform values specified at an arbitrary numeric precision in response to receipt of the first waveform and in accordance with a two-way transducer compensation usage model.

4. The system of claim 1, wherein the ultrasonic encoding apparatus comprises a differential receiver that includes:
   a primary imaging transmit channel;
   a secondary signal generation channel structured to accept a secondary binary or trinary pulse sequence of symbolic values that are configured to energise an incorporated analog filter and attenuator device with a corresponding sequence of positive, negative, or quiescent voltage levels at a corresponding uniform sequence of ultrasonic clock intervals, which are subsequently injected into a primary receiver analog signal path through an analog summation device; and a corresponding ultrasonic encoding apparatus configured to execute an encoding process to convert the first waveform into a second binary or trinary pulse sequence of symbolic values suitable to achieve differential reception and imaging.

5. The apparatus of claim 4 further comprising a differential signal generation channel transmitter circuit and incorporated low-pass filter and attenuator, and wherein the corresponding ultrasonic encoding apparatus is configured to accept a sampled sequence of arbitrary waveform values specified at an arbitrary numeric precision and to provide fidelity of the first waveform to a resulting signal when applied to the differential signal generation channel transmitter circuit and incorporated low-pass filter and attenuator, and subsequently summed with the pulse sequence of positive, negative, or quiescent voltage levels received by the ultrasound probe.

6. A method, comprising:
executing an encoding process at an encoder, the encoding process including:
accepting a symbol set, a symbol quantization clipping level, and an acoustic transducer probe element impulse response as determined by a signal path for a usage model;
executing a calibration of the symbol set;
executing an equalizer function based on the probe element impulse response as determined by the signal path for the usage model; and
executing a symbol quantizer function to produce a binary or trinary pulse sequence of symbolic values;
providing the binary or trinary pulse sequence of symbolic values to energize an ultrasonic transducer element with a corresponding sequence of positive, negative, or quiescent voltage levels; and
accepting the binary or trinary pulse sequence of symbolic values at the ultrasonic transducer element and generating ultrasonic acoustic waves into a medium in response to the binary or trinary pulse sequence of symbolic values.

7. The method of claim 6, wherein accepting a symbol set comprises accepting a sampled sequence of arbitrary waveform values specified at an arbitrary numeric precision.

8. A method, comprising:
executing an encoding process at a corresponding encoding apparatus that utilizes a binary or trinary pulse sequence of symbolic values suitable for a secondary differential signal generation channel to substantially match with a received signal from a primary imaging signal transmit channel in a transducer probe, the executing the encoding process including: configuring the encoding apparatus to accept a sampled sequence of arbitrary waveform values specified at an arbitrary numeric precision in response to receipt of a first waveform, and to provide a substantial match of the first waveform to a resulting summation of a low-pass filter attenuator output and a received primary imaging signal transmit channel in the transducer probe to negate a stationary tissue clutter component in the received primary imaging signal transmit channel in the transducer probe;
providing the binary or trinary pulse sequence of symbolic values to energize a secondary differential signal generation channel with a corresponding sequence of positive, negative, or quiescent voltage levels at a corresponding uniform sequence of ultrasonic clock intervals; and
accepting the binary or trinary pulse sequence of symbolic values at the differential signal generation channel.

9. A method, comprising:
providing a binary or trinary pulse sequence of symbolic values that are configured to energize a secondary differential signal generation channel with a corresponding sequence of positive, negative, or quiescent voltage levels at a corresponding uniform sequence of ultrasonic clock intervals;
accepting the binary or trinary pulse sequence of symbolic values at the differential signal generation channel; and
executing an encoding process at an encoding apparatus that provides a binary or trinary pulse sequence of symbolic values suitable for the secondary differential signal generation channel in an incorporated analog low-pass filter (LPF) in summation with a received signal from a primary imaging signal transmit channel in a transducer probe, the encoding process including configuring the encoding apparatus to accept a sampled sequence of arbitrary waveform values specified at an arbitrary numeric precision, and to provide a substantial match of a first waveform to a resulting summation of a low-pass filter attenuator output and the received signal from the primary imaging signal transmit channel from the transducer probe and negate signal artifacts in the received signal from the primary imaging signal transmit channel from the transducer probe.

10. A system, comprising:
an ultrasound probe configured to produce acoustic waveforms in an acoustic medium and to receive acoustic pressure from the acoustic medium, the ultrasound probe including ultrasonic transducer elements;
an ultrasonic encoder apparatus coupled to the ultrasound probe, the ultrasonic encoder apparatus including an encoder configured to execute an encoding process to convert a first waveform into a binary or trinary pulse sequence of symbolic values, wherein the ultrasonic encoder apparatus is a differential receiver that includes:
a primary imaging transmit channel;
a secondary signal generation channel structured to accept a secondary binary or trinary sequence of symbolic values that are configured to energize an incorporated analog filter and attenuator device with a corresponding sequence of positive, negative, or quiescent voltage levels at a corresponding uniform sequence of ultrasonic clock intervals, which are subsequently injected into a primary receiver analog signal path through an analog summation device; and
the secondary signal generation channel having a corresponding encoder configured to execute an encoding process to convert an RF clutter waveform specification into the secondary binary or trinary pulse symbol sequence to achieve differential reception and imaging; and
a transmitter circuit coupled to the ultrasound probe and the corresponding ultrasonic encoder apparatus and configured to energize at least one ultrasonic transducer element in the ultrasound probe with a corresponding sequence of positive, negative, or quiescent voltage levels at a corresponding uniform sequence of ultrasonic clock intervals in response to receipt of the binary or trinary pulse sequence of symbolic values.

11. The system of claim 10, wherein the ultrasonic encoder apparatus is configured to accept the first waveform as a sampled sequence of arbitrary waveform values specified at an arbitrary numeric precision, and to provide a substantial match of the arbitrary waveform values according to an encoding.

12. The system of claim 11 wherein the encoding fidelity metric comprise a normalized Root Mean Square (RMS) error between the first waveform and a resulting received acoustic pressure in the acoustic medium when applied to the transmitter circuit by the ultrasound probe.

13. The apparatus of claim 12 wherein the normalized RMS error is determined by calibration of a gain mapping for each symbol in a symbol set.

14. A method, comprising:
providing an encoder apparatus that is capable of executing an encoding process to generate a sampled sequence of arbitrary waveform values specified at an arbitrary numeric precision in response to receipt of a first waveform, the encoding process providing a substantial match of the first waveform to a resulting received ultrasonic signal received by an ultrasonic receiver apparatus;
generating at the encoder apparatus the sampled sequence of arbitrary waveform values specified at the arbitrary numeric precision in response to receipt of the first waveform;
generating a binary or trinary pulse sequence of symbolic values in accordance with the encoding process by using the sampled sequence of arbitrary waveform values specified at the arbitrary numeric precision;
converting the binary or trinary pulse sequence of symbolic values into a corresponding sequence of positive, negative, or quiescent voltage levels at a corresponding uniform sequence of ultrasonic clock intervals;
accepting the sequence of positive, negative, or quiescent voltage levels at the ultrasonic transducer element; and
generating an acoustic wave into a medium from the ultrasonic transducer element in response to the accepting the sequence of positive, negative, or quiescent voltage levels.

15. A method, comprising:
providing an encoder apparatus that is capable of executing an encoding process to generate a sampled sequence of arbitrary waveform values specified at an arbitrary numeric precision in response to receipt of a first waveform that provides a substantial match of the first waveform to a resulting acoustic pressure in an acoustic medium when the first waveform is encoded and applied to a transmitter circuit that is coupled to an acoustic transducer probe;
generating at the encoder apparatus the sampled sequence of arbitrary waveform values specified at the arbitrary numeric precision in response to receipt of the first waveform;
generating a binary or trinary pulse sequence of symbolic values in accordance with the encoding process by using the sampled sequence of arbitrary waveform values specified at the arbitrary numeric precision;
converting the binary or trinary pulse sequence of symbolic values into a corresponding sequence of positive, negative, or quiescent voltage levels at a corresponding uniform sequence of ultrasonic clock intervals;
accepting the sequence of positive, negative, or quiescent voltage levels at the ultrasonic transducer element; and
generating an acoustic wave into the acoustic medium from the acoustic transducer probe in response to the accepting the sequence of positive, negative, or quiescent voltage levels.

16. A system, comprising:
an ultrasound probe configured to produce acoustic waveforms in an acoustic medium, the ultrasound probe including ultrasonic transducer elements;
a differential ultrasonic receiver apparatus that includes:
a first ultrasonic receiver apparatus having a first encoder configured to receive a first waveform and to execute an encoding process to convert the first waveform into a binary or trinary pulse sequence of symbolic values;
a transmitter circuit coupled to the first encoder and configured to accept the binary or trinary pulse sequence of symbolic values and in response to receiving the binary or trinary pulse sequence of symbolic values to energize at least one ultrasonic transducer element in the ultrasound probe with a corresponding sequence of positive, negative, or quiescent voltage levels at a corresponding uniform sequence of ultrasonic clock intervals;
an analog summation device;
a primary imaging transmit channel;
a secondary signal generation channel having an analog filter and an attenuator device and structured to receive a secondary binary or trinary pulse sequence of symbolic values that are configured to energize the analog filter and the attenuator device with a corresponding sequence of positive, negative, or quiescent voltage levels at a corresponding uniform sequence of ultrasonic clock intervals and to subsequently inject the sequence of positive, negative, or quiescent voltage levels into a primary receiver analog signal path through the analog summation device; and
a second ultrasonic receiver apparatus having a second encoder configured to receive an RF clutter waveform specification and to execute art encoding process to convert the RF clutter waveform specification into another binary or trinary pulse sequence of symbolic values to achieve differential reception and imaging.

17. The system of claim 16 wherein the differential ultrasonic receiver apparatus is configured to receive the first wave form and accept a sampled sequence of arbitrary waveform values specified at an arbitrary numeric precision generated from the first waveform and to provide a substantial match of the sampled sequence of arbitrary waveform values to a resulting signal when the sampled sequence of arbitrary waveform values is applied to a differential signal generation channel transmitter circuit and incorporated analog filter and attenuator, and subsequently summed with the signal received by an attached transducer probe and ultrasonic receiver apparatus.

18. The system of claim 1 wherein the encoding process comprises an equalizer step followed by a quantization step.

19. The system of claim 18, wherein the encoding process comprises calibrating a symbol set.

20. The system of claim 18, where the quantization step incorporates a search for clipping level.

21. The system of claim 1 wherein the encoding process comprises a step of constrained deconvolution.

22. The system of claim 21 wherein the constrained deconvolution step includes providing a maximum likelihood sequence estimation or Viterbi algorithm.

23. The system of claim 22, wherein the encoding process comprises an impulse response shortening procedure that is applied through use of a reference impulse response.

24. The system of claim 23 wherein the encoding process comprises choosing a reference impulse response scaling from differently-scaled replicas until a lowest-error approximation of an abstracted signal results.

25. The system of claim 8 wherein the encoding process comprises an equalizer step followed by a quantization step.

26. The system of claim 25, wherein the encoding process comprises calibrating a symbol set.

27. The system of claim 25, where the quantization step incorporates a search for clipping level.

28. The system of claim 8 wherein the encoding process comprises a step of constrained deconvolution.

29. The system of claim 28 wherein the constrained deconvolution step includes providing a maximum likelihood sequence estimation or Viterbi algorithm.

30. The system of claim 28, wherein the encoding process comprises an impulse response shortening procedure that is applied through use of a reference impulse response.

31. The system of claim 30 wherein the encoding process comprises choosing a reference impulse response scaling from differently-sealed replicas until a lowest-error approximation of an abstracted signal results.

* * * * *

UNITED STATES PATENT AND TRADEMARK OFFICE
CERTIFICATE OF CORRECTION

PATENT NO. : 10,302,750 B2
APPLICATION NO. : 14/905434
DATED : May 28, 2019
INVENTOR(S) : John A. Flynn et al.

Page 1 of 1

It is certified that error appears in the above-identified patent and that said Letters Patent is hereby corrected as shown below:

In the Claims

Column 16, Claim 4, Line 63:
"energise" should read --energize--.

Column 19, Claim 11, Line 9:
"an encoding." should read --an encoding metric.--.

Column 21, Claim 31, Line 27:
"differently-sealed replicas" should read --differently-scaled replicas--.

Signed and Sealed this
Twenty-fifth Day of February, 2020

Andrei Iancu
*Director of the United States Patent and Trademark Office*